June 12, 1934.  J. F. WOOLLEY, JR., ET AL  1,962,546
ELECTRICALLY OPERATED FROG
Filed March 12, 1932
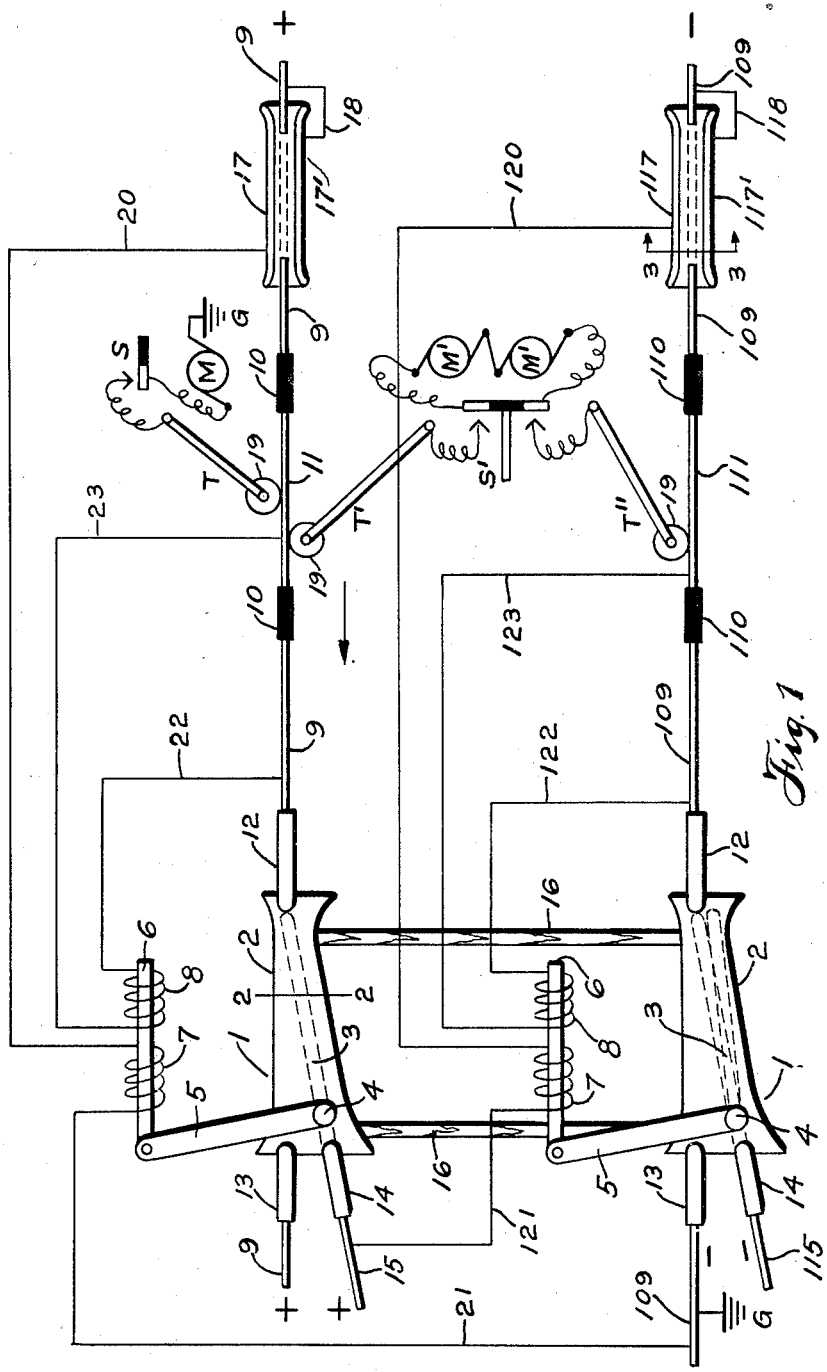
Inventor
JED F. WOOLLEY JR.
LAWRENCE J. LONG
By
Attorney Patented June 12, 1934

1,962,546

UNITED STATES PATENT OFFICE 1,962,546

ELECTRICALLY OPERATED FROG

Jed F. Woolley, Jr., and Lawrence J. Long,
Salt Lake City, Utah

Application March 12, 1932, Serial No. 598,390

2 Claims. (Cl. 191—38)

Our invention relates to electrically operated frogs or switches and to a system of overhead construction in which such frogs are used.

One of the objects of our invention is to provide a system with electrically operated frogs such that the system may be used with a vehicle having single trolley pole such as a street car or with a trolley bus employing two trolley poles and through the means of such system the directing tongue of the frogs will be automatically positioned in one direction and manually positioned in the other direction.

Another object is to provide a system in which a car with a single trolley pole or current collector will operate the frog through which the collector passes without operating the other frog.

Another object is to provide a system in which a vehicle employing a double trolley will operate the tongue of the frogs in one direction independently of each other and independently of each other in the other direction although electrically connected, as later explained.

Our invention resides in the new and novel construction, combination and relation of the various parts and elements hereinafter described and the manner of connecting the parts as shown in the drawing accompanying this specification.

In the drawing:—

Fig. 1 represents a top view of our system including the electrically operated switches, trolley wires, contactors and connections and there is schematically shown the motors, conductor, and collecting devices on a moving vehicle employing a single current collector and also employing a double current collector.

Fig. 2 is a section of the pan and tongue on the line 2—2 of Fig. 1.

Fig. 3 is a section of contactor 117 on the line 3—3 of Fig. 1.

In the preferred embodiment of our invention we employ two electrically operated trolley frogs or switches 1 and each frog is provided with a pan 2 and pivotally mounted tongue 3.

Each tongue is provided with a pivoting member 4 which is secured to its tongue 3 to pivot in unison therewith. Secured to each pivot 4 is an arm 5 such that when the arm 5 moves the pivot and tongue move in unison. Pivotally secured to the arm 5 is a solenoid plunger 6 with two operating coils 7 and 8. The arrangement of the two coils and plunger is such that the energizing of one coil will move the plunger and arm 5 in one direction while the energizing of the other coil will move the plunger and arm 5 in the other direction. This results in a movement of the tongue 3 to its two positions as indicated by dotted lines in the lower switch.

The system involves the use of two trolley wires namely a positive wire 9 and a negative wire 109. The negative wire is as a rule grounded, as at G, especially if the system is to be used with a vehicle having a single current collector as in the case of a street car. Each trolley wire is provided with section insulators 10 and 110 producing a section of trolley 11 and 111 which is insulated from the main trolley 9 and 109 except as connected through the medium of the coil 8 on the switches and its connections; the continuity of the trolley wires 9 and 109 is broken by the insulated sections 11 and 111.

Each switch 1 is also provided with projecting arms 12, 13 and 14 to which the trolley wires 9, 109, 15 and 115 are connected. The wires 15 and 115 may be termed "branch" wires and wires 9 and 109 termed "through" wires. It will be noted that if the switch tongues are set as shown in the upper switch then the current collector will move from the wire 9 or 109 to the arm 12 and be guided by the tongue 3 onto the arm 14 and wire 15 or 115 but if the tongue 3 is set in its other position then the current collector will move from the trolley 9 or 109 onto the arm 12 then across the pan 2 onto the arm 13 and wire 9 or 109. The same is true of the lower switch.

The two switches may be held in fixed relation if desired by means of insulated cross bars 16.

The trolley wires are provided with contactors and each contactor has two oppositely disposed contact members, namely, 17—17' and 117—117' to be bridged or electrically connected by a trolley as shown in Fig. 3. The contact members are of metal and one is connected to the trolley wire by a conductor 18 and 118 and the other member is connected to one of the switch coils. The contact members are insulated from each other excepting when connected by means of a current collector 19.

The coils 7 each have one terminal connected to their respective contactor members 17 and 117 respectively and their other terminal connected to the trolley wire or other conductor of opposite polarity to their respective contactors. The coils 8 each have one terminal connected to their respective insulated sections 11 and 111 and the other terminal connected to the trolley wires 9 and 109 respectively.

The above insulated sections 11 and 111 may be replaced by other means, as for instance the contactors referred to may be employed by connecting both contact members 17—17' and 117—117' together and to the coil 8 thus the coil 8 will be energized only when the contactors are engaged by the current collector.

It will be seen that with no vehicles passing through the system the circuits through the coils are deenergized.

We will first describe the operation of our system considering that a street car with a single current collector is passing through the system and is moving from right to left as indicated by the arrow. The street car is provided with the trolley pole T and wheel 19, a manually operated controller or switch S and motor M connected as shown between the trolley and ground. Thus the negative or outgoing trolley must be grounded.

When the collector engages the contactor members 17 and 17' current will then flow from the trolley 9 through the conductor 18 through the members 17 and 17' by means of the trolley wheel 19 then through the conductor 20, coil 7 and conductor 21 to the trolley 109 or the ground G. Thus the coil 7 which might be termed a voltage coil will be energized as long as the wheel 19 engages the contact members 17—17' and the tongue 3 will be automatically moved to a position either to guide the wheel on the wire 9 or to the wire 15 as previously determined and for discussion we will assume that it is automatically set to guide the wheel around the curve or from the wire 9 to the wire 15.

It will be apparent that this operation takes place independently of any control which the motorman of the car may have, that is, regardless of whether the car is drawing current from the trolley wire or not.

The coils 7 are of sufficiently high resistance such that being connected directly across the power lines the current flowing therethrough will be of a small amount and this can be regulated by the resistance of the coil 7 or by the insertion of an external resistance.

As the vehicle advances toward the switch 1 the trolley T will come in contact with the insulated section 11 and at this point the movement of the tongue 3 is under control of the motorman. If the motorman closes his controller S, current will then flow from the conductor 9 through the conductor 22, coil 8, conductor 23, trolley T, switch S, motor M to ground G thus energizing the coil 8 and moving the switch tongue to the other position than that shown in the upper switch and the car will proceed to pass through the switch from trolley wire 9 to wire 9.

If the motorman does not close his switch S but coasts across the section 11 then the coil 8 will not be energized and the tongue 3 will remain in the position shown in Fig. 1 or the position predetermined upon.

The coil 8 is in series circuit with the motor M therefore it must be constructed to withstand a large amount of current, hence its resistance must be lower as compared with that of coil 7.

In the operation just described there has been no operation of the switch 1 in the trolley wire 109.

If, now, a trolley bus vehicle should pass through the system provided with two trolleys or current collectors T' and T'' the conductor switch S' and motors M' it will be seen that when the current collectors engage the contactor members 17—17' and 117—117' moving in the direction of the arrow that the operation of the switch in the positive trolley will be as described before and the operation of the switch in the negative wire will be also the same as the switch in the positive wire but the operations will be independently of each other and the energizing current for the negative switch 1 will flow from the positive wire 9 or 15 through the conductor 121, coil 7 and conductor 120 to contactor member 117, through wheel 19, contact member 117' and conductor 118 to trolley wire 109.

When the vehicle moves with its current collectors onto the insulated sections 11 and 111 and if the motorman should now close his controller S' current will flow from the wire 9 through the conductor 22, coil 8, conductor 23, section 11, trolley T', switch S', motors M', switch S', trolley T'', section 111, conductor 123, coil 8 and conductor 122 to trolley wire 109 or ground G. It will be noted that the coils 8 are connected in series while the coils 7 remain independent of each other.

From the description of the operations both with vehicles having a single and double current collector it will be evident that maintaining the operation of the switches independent of each other such that the single switch only operates when a vehicle using single trolley is passing and the two switches operate in a system with two trolleys passing that the depreciation upon the switch in the negative wire is materially reduced and also the liability of burning out or damaging the coils is reduced as such condition takes place as a rule only during energization of the coils.

It will be noted that while the two coils 8 are connected exactly alike with respect to their respective trolley wires that when the sections 11 and 111 are electrically connected by a passing vehicle that these coils are then connected in series and are energized to operate the switches in one direction but if the controller on the moving vehicle is in its open or "off" position then the coils 8 are not energized as the sections 11 and 111 are not electrically connected and thus the switch tongues remain in the position as set by the vehicle when its trolleys engage contactor members 17—17' and 117—117'. The tongues will be yieldingly held in either of their positions.

Having described our invention we claim:—

1. An overhead switch system operating with either a double-collector vehicle and an ungrounded motor system or a single-collector motor vehicle and a grounded motor system for guiding the current collectors on the moving vehicles comprising a pair of spaced and insulated trolley wires of opposite polarity, one of said wires being grounded, a trolley frog associated with each wire and each frog having a movable tongue to guide the lateral movement of the collector, electrically operated mechanism associated with each frog for actuating the same both independently of and at will of the motorman on the moving vehicle, a pair of contact members for each frog and each trolley wire, one of the contact members of each wire being electrically connected through a portion of the operating mechanism to the other wire, each said one contact member also being adapted to be electrically connected to its associated wire by a current collector passing along the last mentioned wire whereby the electrically operated mechanism of one or both frogs will be energized, depending upon whether one or both contactors are engaged by current collectors and another pair of contact members, one for each frog and trolley wire and each being adapted to connect another portion of the electrically operating mechanism of its associated frog in series with the vehicle operating circuit whereby either or both of said last mentioned portions may be operatively energized providing the controller switch is in its "power on" position and depending upon whether one or both of the last mentioned contact members are engaged by current collectors of a single-collector vehicle or a double-collector vehicle.

2. An overhead switch system operating with either a double-collector vehicle and an ungrounded motor system or a single-collector motor vehicle and a grounded motor system for guiding the current collectors on the moving vehicles comprising a pair of spaced and insulated trolley wires of opposite polarity, one of said wires being grounded, a trolley frog associated with each wire and each frog having a movable tongue to guide the lateral movement of the collector, electrically operated mechanism associated with each frog for actuating the same both independently of and at will of the motorman on the moving vehicle, a pair of contact members for each frog and each trolley wire, one of the contact members of each wire being electrically connected through a portion of the operating mechanism to the other wire, each said one contact member also being adapted to be electrically connected to its associated wire by a current collector passing along the last mentioned wire whereby the electrically operated mechanism of one or both frogs will be energized, depending upon whether one or both contactors are engaged by current collectors and another pair of contact members, one for each frog and trolley wire and each being adapted to connect another portion of the electrically operating mechanism of its associated frog in series with and through a circuit on the vehicle controlled by a circuit breaker whereby either or both of said last mentioned portions may be operatively energized providing the circuit breaker is in its closed position and depending upon whether one or both of the last mentioned contact members are engaged by current collectors of a single-collector vehicle or a double-collector vehicle.

JED F. WOOLLEY, JR.
LAWRENCE J. LONG.